United States Patent
Suzuki et al.

(10) Patent No.: US 8,554,733 B2
(45) Date of Patent: Oct. 8, 2013

(54) DISASTER RECOVERY METHOD, DISASTER RECOVERY SYSTEM, REMOTE COPY METHOD AND STORAGE SYSTEM

(75) Inventors: Yoshio Suzuki, Kokubunji (JP); Nobuo Kawamura, Atsugi (JP); Kota Yamaguchi, Yamato (JP); Shinji Fujiwara, Sagamihara (JP); Satoru Watanabe, Kokubunji (JP)

(73) Assignee: Hitachi Ltd., Tokyo (JP)

( * ) Notice: Subject to any disclaimer, the term of this patent is extended or adjusted under 35 U.S.C. 154(b) by 955 days.

(21) Appl. No.: 11/152,199

(22) Filed: Jun. 15, 2005

(65) Prior Publication Data

US 2006/0242370 A1    Oct. 26, 2006

(30) Foreign Application Priority Data

Apr. 20, 2005    (JP) .................................. 2005-121805

(51) Int. Cl.
*G06F 17/30* (2006.01)

(52) U.S. Cl.
USPC ........... 707/640; 707/644; 707/648; 707/652; 707/653; 707/654

(58) Field of Classification Search
None
See application file for complete search history.

(56) References Cited

U.S. PATENT DOCUMENTS

| | | | | |
|---|---|---|---|---|
| 5,287,501 A | * | 2/1994 | Lomet | 707/648 |
| 5,640,561 A | | 6/1997 | Satoh et al. | |
| 5,740,433 A | * | 4/1998 | Carr et al. | 707/202 |
| 5,819,272 A | * | 10/1998 | Benson | 707/8 |
| 5,832,515 A | * | 11/1998 | Ledain et al. | 707/999.202 |
| 5,991,197 A | * | 11/1999 | Ogura et al. | 365/185.11 |
| 6,023,707 A | * | 2/2000 | Hamada et al. | 707/648 |
| 6,065,018 A | * | 5/2000 | Beier et al. | 707/202 |
| 6,122,640 A | * | 9/2000 | Pereira | 707/648 |
| 6,484,187 B1 | * | 11/2002 | Kern et al. | 707/204 |
| 6,732,123 B1 | * | 5/2004 | Moore et al. | 707/202 |
| 7,039,660 B2 | | 5/2006 | Kitsuregawa et al. | |
| 7,085,782 B2 | * | 8/2006 | D'Angelo et al. | 707/202 |
| 7,263,537 B1 | * | 8/2007 | Lin et al. | 707/639 |
| 2004/0193658 A1 | | 9/2004 | Kawamura et al. | |
| 2004/0230623 A1 | * | 11/2004 | D'Angelo et al. | 707/202 |

FOREIGN PATENT DOCUMENTS

| | | |
|---|---|---|
| JP | 2004199497 | 7/2004 |
| JP | 2004334460 | 11/2004 |

OTHER PUBLICATIONS

Screenshot of File properties box from Microsoft Windows XP, Aug. 2001.*
"Sanrise Solution Suite with Oracle", pp. 1-6.
No Data Loss with Oracle 8i Data Guard and SRDF, Jun. 2001—Rev 1. pp. 1-50.

(Continued)

*Primary Examiner* — Debbie Le
(74) *Attorney, Agent, or Firm* — Brundige & Stanger, P.C.

(57) ABSTRACT

A disaster recovery technology capable of achieving the high-speed FO and correctly reading the logs even if the unit of logs written in the main site is large is provided. In the disaster recovery system comprising a main site and a sub-site, when the writing in units of a log block consisting of a plurality of log records is performed in the main site and the logs are applied in the sub-site, the log blocks are read from the sub-storage to verify the consistency, and it is determined whether the reading process conflicts with the writing process through the remote copy operation when reading the logs. Then, only the log blocks in which the reading process does not conflict with the writing process as a result of the determination are applied to the database. Thereby, the logs are applied in the sub-site independently to recover the database.

9 Claims, 15 Drawing Sheets

(56) References Cited

OTHER PUBLICATIONS

Japanese Office Action dated Dec. 21, 2010, issued in corresponding Japanese Patent Application No. 2005-121805.

* cited by examiner

*FIG. 15* PRIOR ART
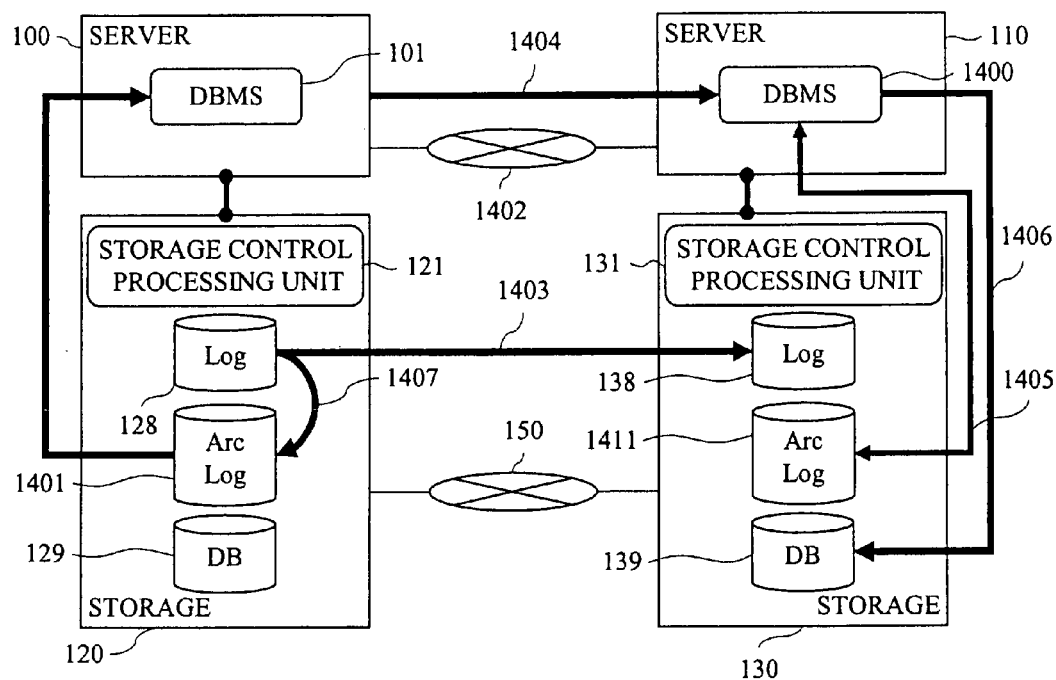
*FIG. 16* PRIOR ART
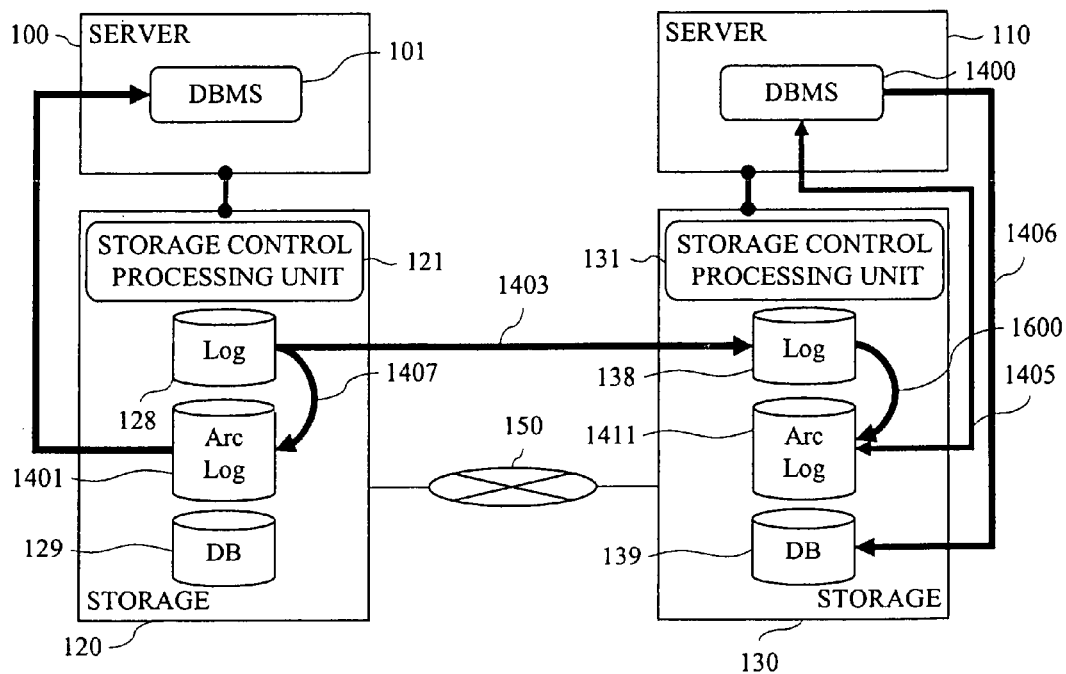

DISASTER RECOVERY METHOD, DISASTER RECOVERY SYSTEM, REMOTE COPY METHOD AND STORAGE SYSTEM

CROSS-REFERENCE TO RELATED APPLICATION

The present application claims priority from Japanese Patent Application No. JP2005-121805 filed on Apr. 20, 2005, the content of which is hereby incorporated by reference into this application.

The present application is related to U.S. application Ser. No. 10/989398, filed on Nov. 17, 2004, titled "Disaster Recovery System Suitable for Database System" and U.S. application Ser. No. 11/012,102, filed on Dec. 16, 2004, titled "Method and Program for Creating Backup Data in A Database Backup System".

Technical Field of the Invention

The present invention relates to a disaster recovery technology by means of a log transfer. More specifically, the present invention relates to the technology effectively applied to a disaster recovery technology in which logs are read and applied in units finer than a file and the log rereading or the reading in cooperation with a remote copy operation is used in the log reading and application process.

BACKGROUND OF THE INVENTION

Recently, IT has been fundamental to business and taken on a growing importance. Thus, the effect of a system down is enormous. In the case of finance industry, it is reported that the loss due to the system down reaches several million dollars by hour, for example. In such an environment, a disaster recovery (hereinafter referred to as DR) to backup data to a remote site in order to continue the business even if any disaster occurs has come under the spotlight.

As a method to achieve the transfer between sites in the DR system, a method using a high performance storage having a remote copy function has gotten a lot of attention. The advantage of the method using the remote copy is that the transfer between sites can be achieved without consuming the resource of the server.

According to the circumstance of the legal control in response to terrorism and wide area disasters, even the DR system using the remote copy is required to accomplish the following objects at the same time: (1) Business can be restarted at a sub-site without the loss of data even in the event of a disaster; and (2) The online performance of the main site can be maintained even if the sub-site is located at the remote site away from the main site more than several hundred km in order to cope with the case of a wide area disaster.

The DR system is introduced mainly into financial industry and large companies at present. However, it will be necessary for medium and small companies to introduce the DR system in order to prevent risks and grade up the companies for the future. In order to extend the applicable scope of the DR system to medium and small companies, it is important that the cost of the DR system is reduced in addition to the achievement of the above-described two objects. Meanwhile, the exclusive line is mostly used for the present DR system from the viewpoint of reliability and security. Since enormous money is required to construct and maintain the broadband exclusive line, the line cost must be reduced in order to reduce the cost of the DR system.

As a method to solve the above-described problem, a DR method in which only log files of a database management system (hereinafter referred to as DBMS) are transferred through a remote copy operation and the file of a database (hereinafter referred to as DB) is recovered from the logs in the sub-site has attracted a log of attention. Since it is not necessary to transfer a DB file in this method, it is possible to significantly reduce the line cost. Additionally, in the DR method in which logs are transferred, the speed-up of the switching (the failover) in the event of a disaster and the intentional switching and the operation manageability are required nowadays.

As a method of transferring a log file through a remote copy operation and recovering a DB file (DB volume: hereinafter the volume is referred to as VOL) in the sub-site, the conventional method 1 (SANRISE Solution Suite with Oracle ) and the conventional method 2 (US Patent No. 5640561) are known, for example.

<Conventional Method 1>

The conventional method 1 is shown in FIG. 15. FIG. 15 is a diagram showing an example of the configuration of a system to which the conventional method 1 is applied. In FIG. 15, reference numeral 101 is a DBMS in a server 100 of a main site, 1400 is a DBMS in a server of a sub-site, 120 is a storage of the main site, 130 is a storage of the sub-site, 128 and 138 are log VOLs, 129 and 139 are DB VOLs, 1401 and 1411 are archive log VOLs and 1402 is a network, respectively. In addition, reference numerals 1403, 1404, 1405, 1406 and 1407 denote the processing routes of a remote copy operation, an inter-server transfer, a log reading, a log application, and an archiving, respectively.

Generally, in the log file (log VOL) on which the log which is the update difference to the DB is recorded, the generation management of a plurality of log files is performed and a new log is additionally recorded while switching at the timing of, for example, capacity shortage. At this time, since the log file is repeatedly overwritten, an archive log file (archive log VOL) is created in order to save the content of the original log file.

In the method of FIG. 15, the log is transferred through a remote copy operation and an archive log is transferred between the servers. The archive log is received at a standby DBMS of the computer in the sub-site and the received archive log is applied to recover the DB (DB VOL).

<Conventional method 2>

The conventional method 2 is shown in FIG. 16. FIG. 16 is a diagram showing an example of the configuration of a system to which the conventional method 2 is applied. In FIG. 16, a reference numeral 1600 is a processing route representing an archiving, and the same components as those in FIG. 15 are denoted by the same numerals and symbols as those in FIG. 15.

Only logs are transferred through the remote copy operation in the method of FIG. 16. In the sub-site, the creation of an archive log file in the main site is monitored. When it is detected that the archive log file is created, the sub-site independently creates an archive log file, and then the created archive log file is applied to update the DB.

SUMMARY OF THE INVENTION

Incidentally, in the above-described conventional methods, the log of one or more generation older is applied in unites of a file instead of the latest log file being written in the main site. The reason is that the consistency of the read content cannot be assured if the VOL being written through the remote copy operation is directly read. The possible problems of the above-described two methods are as follows.

<Problem 1: Difficulty of a Rapid FO (Failover: Inter-site Switching)>

Generally, it is not preferred that the log file is frequently archived from the viewpoint of making the operation easy, and the size of the log file tends to enlarge. Therefore, in the method in which the recovery is executed in units of a file, the log application must be started from the top of a file with a large size both in a disaster FO and an intentional FO. Consequently, it takes much time to complete the FO and it is impossible to rapidly restart the service.

<Problem 2: Compatibility of Maintenance of the Online Performance and Assurance of Consistency of the DB in the Main Site>

In order to shorten the time for FO, it is preferable that the reading and application in units finer than a file are executed with using the log file in use in the main site as the reading target instead of the reading and application in units of a log file. In this case, it should be assured that the log is correctly read in order to properly recover the DB. However, if the log file is read while the writing is being performed through a remote copy operation, the log is read incorrectly in some cases. The configuration of a log file and then the case where the log is incorrectly read will be described below.

Firstly, the configuration of a log file and the read/write method will be described. Here, the update difference data for the row is referred to as a log record. The log record is always created in the DBMS of the main site at each update. However, if the log record is outputted to the storage each time of creating the log record, it has a major influence on the performance of the online. Therefore, each log record is buffered inside and it is outputted in units of a log block consisting of a plurality of records. A header and a trailer are added to the log block, and if both of the header and the trailer are normally written, the consistency of the block can be assured. Therefore, logs are read in units of a block even in the reading in the sub-site, and the consistency can be verified by the header and the trailer.

However, the consistency cannot be verified in some cases only by the above-described process in the case of applying to the DR system designed in consideration of a wide area disaster. When the distance between the sites is long and the delay of transfer is large, it is preferred that the size of each block is enlarged and the number of times of transfer is reduced in order to minimize the influence of the transfer delay. However, when the size of the block becomes larger than the unit of cache management (unit of reading) of the storage, the consistency of each log block cannot be correctly verified in some cases. The incorrect consistency verification of the log blocks as described above occurs when the log application completely catches up with the online processing in the main site and the log application function of the sub-site attempts to read the region in which the writing is being executed in the main site.

An example is shown in FIG. 17. FIG. 17 is a drawing for explaining an example in which the log cannot be correctly read. In FIG. 17, a reference numeral 1500 is a log block, 1501 is a writing (1) region, 1502 is a reading (1) region, 1503 is a writing (2) region, 1504 is a reading (2) region, and 1505 is the log block read by a log application unit, respectively.

The DBMS of the main site is used for the writing of the entire log block and the log block is divided into a plurality of IOs by the OS layer in some cases. The log block is divided into two IOs in FIG. 17 and each of them is transferred through the remote copy operation. In the sub-site, the log application unit having the log application function performs reading process independently of the IO of the main site. At this time, data is managed in cache management units in the storage and the reading is also executed in the cache management units.

One writing by the DBMS of the main site is divided into two writings by the OS layer in FIG. 17. When only the one writing is completed, the first reading of the log application is performed (t→t+2). Subsequently, after the second writing is completed and the entire block is completely written, the second reading is performed by the log application unit (t+3→t+4). As a result, the middle portion of the log block 1505 read by the log application unit is empty as shown in FIG. 17. In this case, since the top and the end (header/trailer) are correctly read, it is determined that the log block is correct and the log is applied. Consequently, the DB of the sub-site is destroyed.

As described above, the DR method in which logs are transferred through the remote copy operation in order to reduce the cost of the line and the DB is recovered by applying the logs has the following problems: (1) FO cannot be rapidly performed when the reading and application are performed in units of a log file; and (2) When the logs are applied in units finer than a file in order to rapidly perform the FO, the incorrect log may be read and applied and as a result the DB is destroyed.

In such a circumstance, an object of the present invention is to provide a DR technology in which logs are read and applied in units finer than a file to achieve the speed up of FO and the log rereading or the reading in cooperation with a remote copy operation is used in the log reading and application process so as to correctly read the logs even if the unit of logs written in the main site is large.

The above and other objects and novel characteristics of the present invention will be apparent from the description and the accompanying drawings of this specification.

The typical ones of the inventions disclosed in this application will be briefly described as follows.

In the present invention, logs are read and applied in units finer than a file in order to speed up the FO, and the log rereading or the reading in cooperation with a remote copy operation is used in the log reading and application process in order to correctly read the logs even if the unit of logs written in the main site is large. More specifically, a DR method and a DR system to copy the data of the DBMS of the main site to the sub-site located in the remote site, and a remote copy method and a storage system to reflect the data update in the first storage (main storage) to the second storage (sub-storage) located in the remote site according to the present invention have the following characteristics.

(1) In the log application process in which the logs are transferred through the remote copy operation of the main storage in the main site and the transferred logs are applied to recover the DB of the sub-storage in the sub-site, when the logs are written in units of a log block consisting of a plurality of log records in the main site and the logs are applied in the sub-site, the following processes are performed. That is, log blocks are read from the sub-storage to verify the consistency; it is determined whether or not the reading process conflicts with the writing process through the remote copy operation when reading the log blocks; and only the log blocks in which the reading process does not conflict with the writing process through the remote copy operation based on the result of the determination are applied to the DB.

(2) In the method of using the log rereading, when the logs are applied in the sub-site, the following processes are performed. That is, the log blocks are read from the sub-storage to verify the consistency; it is determined whether or not the reading process does not conflict with the writing process through the remote copy operation in the log blocks except for the last one among the read log blocks; and the log blocks except for the last one are reread and then applied. By doing so, the logs are applied while being checked whether those are correctly read and the logs can be independently applied in the sub-site to recover the DB without the communication and the processing for designating the log to be read from the main site.

(3) In the method of using the reading in cooperation with remote copy operation, when the logs are applied in the sub-site, the following processes are performed. That is, the second copy operation is interrupted; the log blocks are read from the second volume; the read log blocks are applied; and the log application process is interrupted and then the second copy operation is restarted when there are no logs to be read. By doing so, the second copy is interrupted when the logs are read so that the conflict of the log reading with the writing through the remote copy operation can be prevented, and the logs can be independently applied in the sub-site to recover the DB without the communication and the processing for designating the log to be read from the main site.

The effect obtained by the representative one of the inventions disclosed in this application will be briefly described as follows.

(1) It can be assured that there is not any defect when logs are synchronously transferred. Additionally, since logs can be transferred through the remote copy operation without consuming the server resource, it has little influence on the online performance of the main site.

(2) Since it is not necessary to transfer the DB file updated frequently, a narrow bandwidth line can be employed. Therefore, the cost of the line can be reduced.

(3) The logs are applied in units finer than a file. Therefore, the service can be rapidly restarted even in the switching of sites.

(4) Even if the 10 unit of the log is large in order to maintain the online performance of the main site, since the rereading operation or the process in cooperation with the remote copy operation is used, it is possible to prevent the DB from being destroyed due to the incorrect reading. Therefore, the sub-site can be located away from the main site more than several hundred km in consideration of a wide area disaster.

(5) The logs can be independently applied by only the log application unit in the sub-site to recover the DB without additionally providing the processing and communication for determining the log reading position for the main site.

BRIEF DESCRIPTIONS OF THE DRAWINGS

FIG. 15 is a diagram showing an example of the configuration of the system to which the conventional method 1 is applied in comparison with the present invention;

FIG. 16 is a diagram showing an example of the configuration of the system to which the conventional method 2 is applied in comparison with the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<First Embodiment>

The DR system according to the first embodiment of the present invention will be described with reference to FIG. 1 to FIG. 6.

Figure 1:
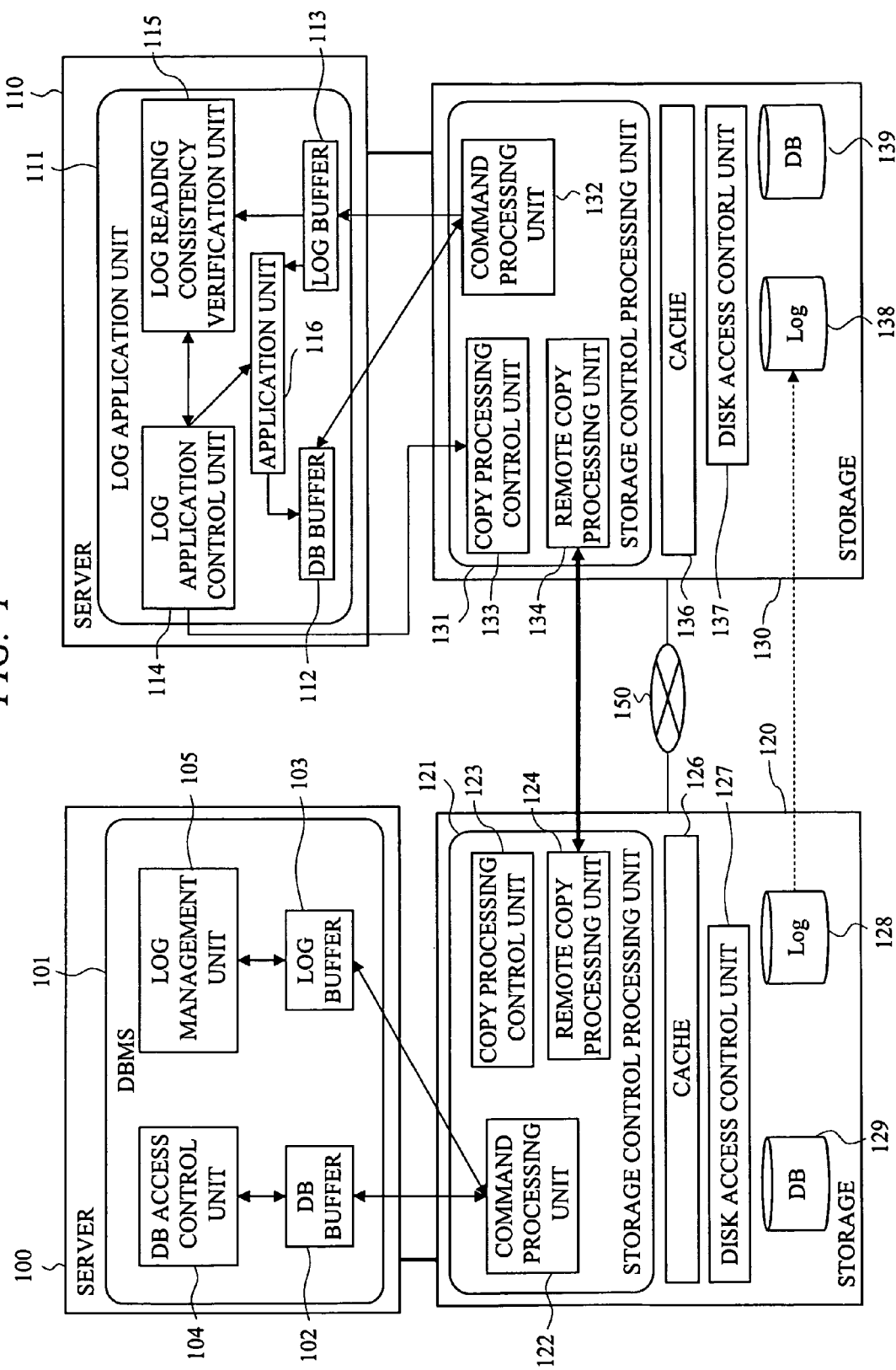
FIG. 1 is a diagram showing an example of the configuration of the DR system according to the first embodiment of the present invention.

Firstly, an example of the configuration of the DR system according to this embodiment will be described with reference to FIG. 1. FIG. 1 is a diagram showing an example of the configuration of the DR system.

The DR system according to this embodiment employs a method in which logs are reread and is composed of a main site and a sub-site. The main site comprises a server 100 including a computer on which a DBMS is operated and a storage 120 to store the log file and the DB file of the DBMS. The sub-site comprises a server 110 including a computer on which a sub-DBMS to perform log application process or a function specialized to apply logs (log application function)

is operated and a storage 130. The storage 120 of the main site and the storage 130 of the sub-site are connected through a network 150.

A DBMS 101 is operated in the server 100 of the main site, and the DBMS 101 includes a DB buffer 102, a log buffer 103, a DB access control unit 104 and a log management unit 105. The storage 120 of the main site includes a storage control processing unit 121, a cache 126, a disk access control unit 127, a log VOL (Log) 128 and a DB VOL (DB) 129. The storage control processing unit 121 includes a command processing unit 122, a copy processing control unit 123 and a remote copy processing unit 124.

A log application unit 111 is operated in the server 110 of the sub-site, and the log application unit 111 includes a DB buffer 112, a log buffer 113, a log application control unit 114, a log reading consistency verification unit 115 and an application unit 116. The storage 130 of the sub-site includes a storage control processing unit 131, a cache 136, a disk access control unit 137, a log VOL (Log) 138, and a DB VOL (DB) 139. The storage control processing unit 131 includes a command processing unit 132, a copy processing control unit 133 and a remote copy processing unit 134.

The DBMS 101 is operated in the server 100 of the main site. The DBMS 101 refers or updates data stored in the DB VOL 129 in the storage 120 in accordance with the instruction from a UAP (user application). When the DB VOL 129 is updated, the DBMS 101 firstly stores the update difference data in the log VOL 128 in the storage 120 as a log. Note that the DBMS 101 has the log management unit 105 and the DB access control unit 104, each of which accesses the data in the storage 120 through the DB buffer 102 and the log buffer 103.

The storage 120 of the main site has a remote copy function. Similarly, the storage 130 of the sub-site also has the remote copy function. Each component of the sub-site identical to that of the main site is described in ( ) along with the component of the main site. When an I/O request is issued from the server 100(110), the request is received by the command processing unit 122(132). When the request is a write request, data is updated on the cache 126(136) provided that there is the data on the cache 126(136). If there is no data on the cache 126(136), the disk access control unit 127(137) is requested the corresponding data and the data is copied from the disk constituting the VOL to the cache 126(136) and then written. In addition, the written data is asynchronously returned and written to the disk by the disk access control unit 127(137).

In this case, when the data is written to the VOL targeted for a remote copy operation, the data is written to the cache 126(136), and subsequently the data is also written to the corresponding region (cache 136) of the storage 120 of the sub-site by the remote copy processing unit 124 (134). Also, the state control of the remote copy such as start /stop(disconnection) /interruption of the copy can be performed by sending the instruction to the copy processing control unit 123(133). Note that the log VOL 128(138) in the storage 120(130) of the main/sub sites is targeted for the remote copy operation in this embodiment.

The log application unit 111 is operated in the server 110 of the sub-site. The log application unit 111 reads the log VOL 138 transferred through the remote copy operation and updates data contained in the DB VOL 139. The log reading consistency verification unit 115 reads the log from the log VOL 138 and verifies the consistency of the read log. The log application unit 111 applies the read log to update the data on the DB VOL 139. The log application control unit 114 controls the log reading consistency verification unit 115 and the application unit 116 to recover the DB. Incidentally, similar to the DBMS 101, the log application unit 111 also accesses the data on the VOL through the DB buffer 112 and the log buffer 113.

When the log application function is used for the log application instead of the sub-DBMS in the DR system according to this embodiment, the sub-DBMS to continue the service after switching may be operated in the server of the sub-site and another server. Hereinafter, the case where the log application function is employed will be described. The storage 120 of the main site and the storage 130 of the sub-site are connected through the inter-storage network 150, and only the log files are transferred through the remote copy operation.

Figure 2:
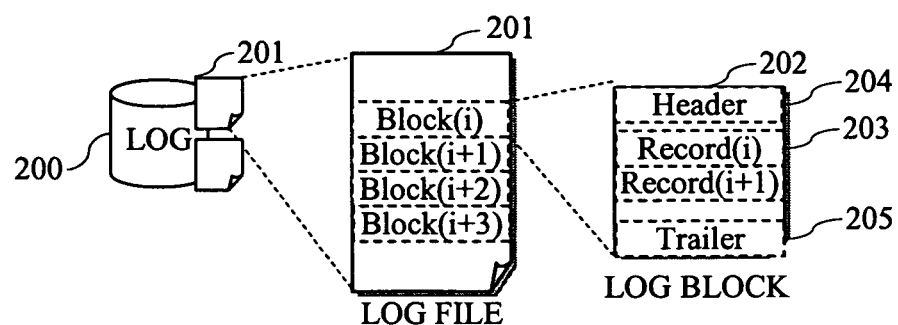
FIG. 2 is a diagram showing an example of the configuration of the log file according to the first embodiment of the present invention.

The log application function of the sub-site directly reads the log file 201 on a log VOL 200 as shown in FIG. 2 to which logs are transferred through the remote copy operation and applies them. FIG. 2 is a diagram showing an example of the configuration of the log file.

The log file 201 is read and written in units of a block consisting of log records 203. More specifically, the DBMS of the main site writes the log file in units of a block, and the log application function reads in units of a block. A header 204 is added to the top of a log block 202 and a trailer 205 is added to the end of the log block 202. Each of the header 204 and the trailer 205 includes a magic word, and the consistency of the entire block can be verified by the magic word.

Figure 3:
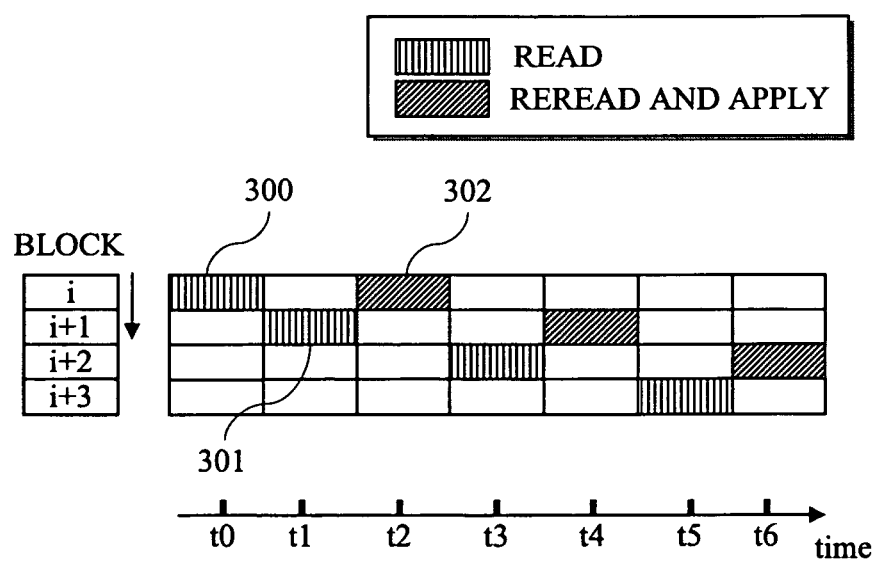
FIG. 3 is a diagram showing an example of the schedule of reading and application of the log block according to the first embodiment of the present invention.

As described above, however, in the case where the size of the log block 202 is large and the log application catches up with the start of log writing, if the writing through the remote copy operation conflicts with the reading by the log application function, the consistency cannot be assured only by the consistency verification using the header and trailer. Therefore, the logs are read and applied in accordance with the schedule shown in FIG. 3. FIG. 3 is a diagram showing an example of the schedule of reading and application of the log block.

More specifically, when a certain log block (block (i)) is read and applied (300), firstly it is checked whether a next log block (block (i+1)) can be read in order to assure the reading and writing for the block (block (i)) do not conflict (301). When the next block (block (i+1)) can be read, the previous log block (block (i)) is reread and then applied (302). Since the logs are sequentially written, it can be determined that the writing of the log block (block (i)) is normally completed provided that the log block (block (i+1)) is written. Therefore, the consistency of the log block can be assured.

Figure 4:
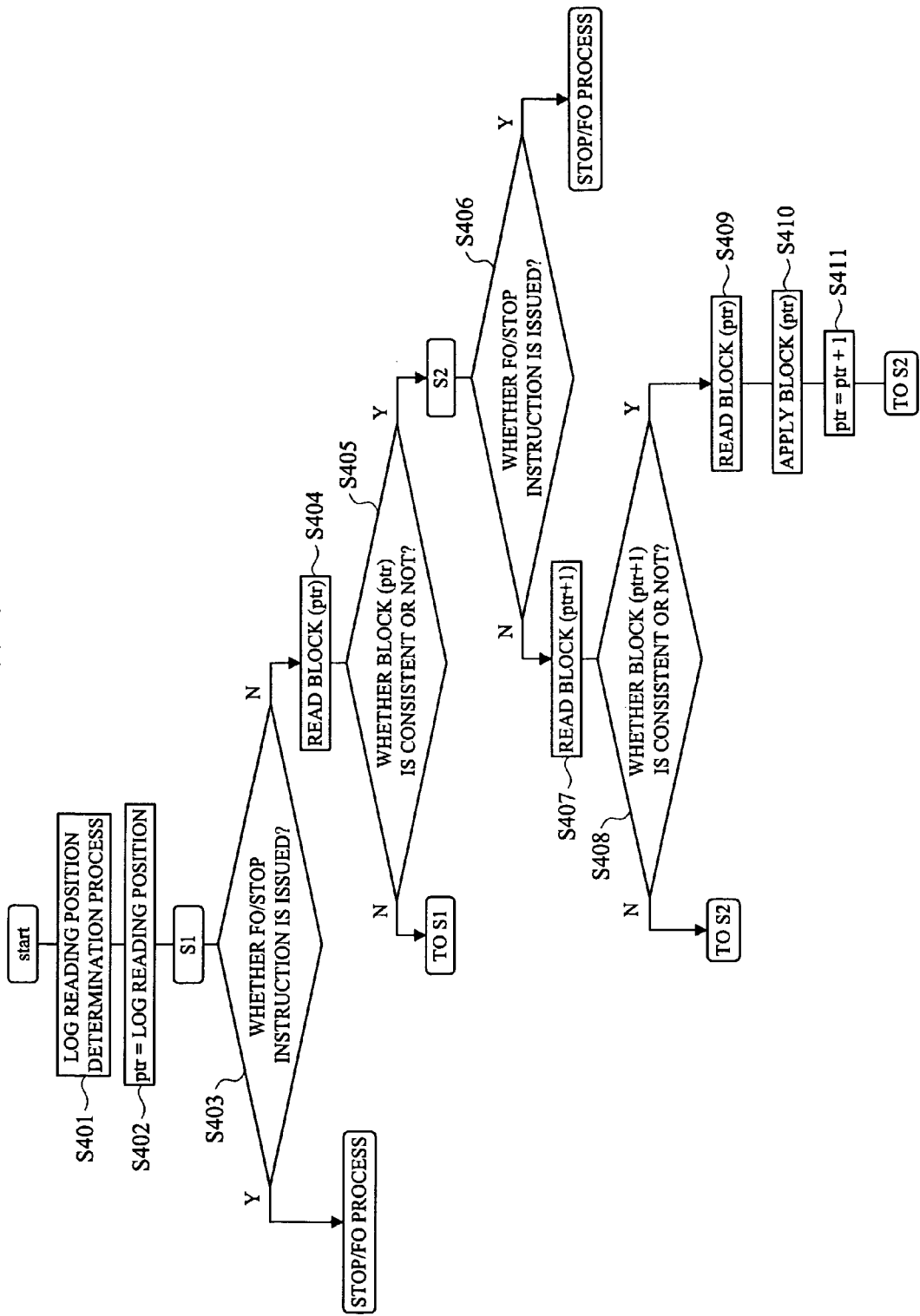
FIG. 4 is a diagram showing an example of the flow of the log reading/application process (at a normal time) according to the first embodiment of the present invention.
Figure 5:
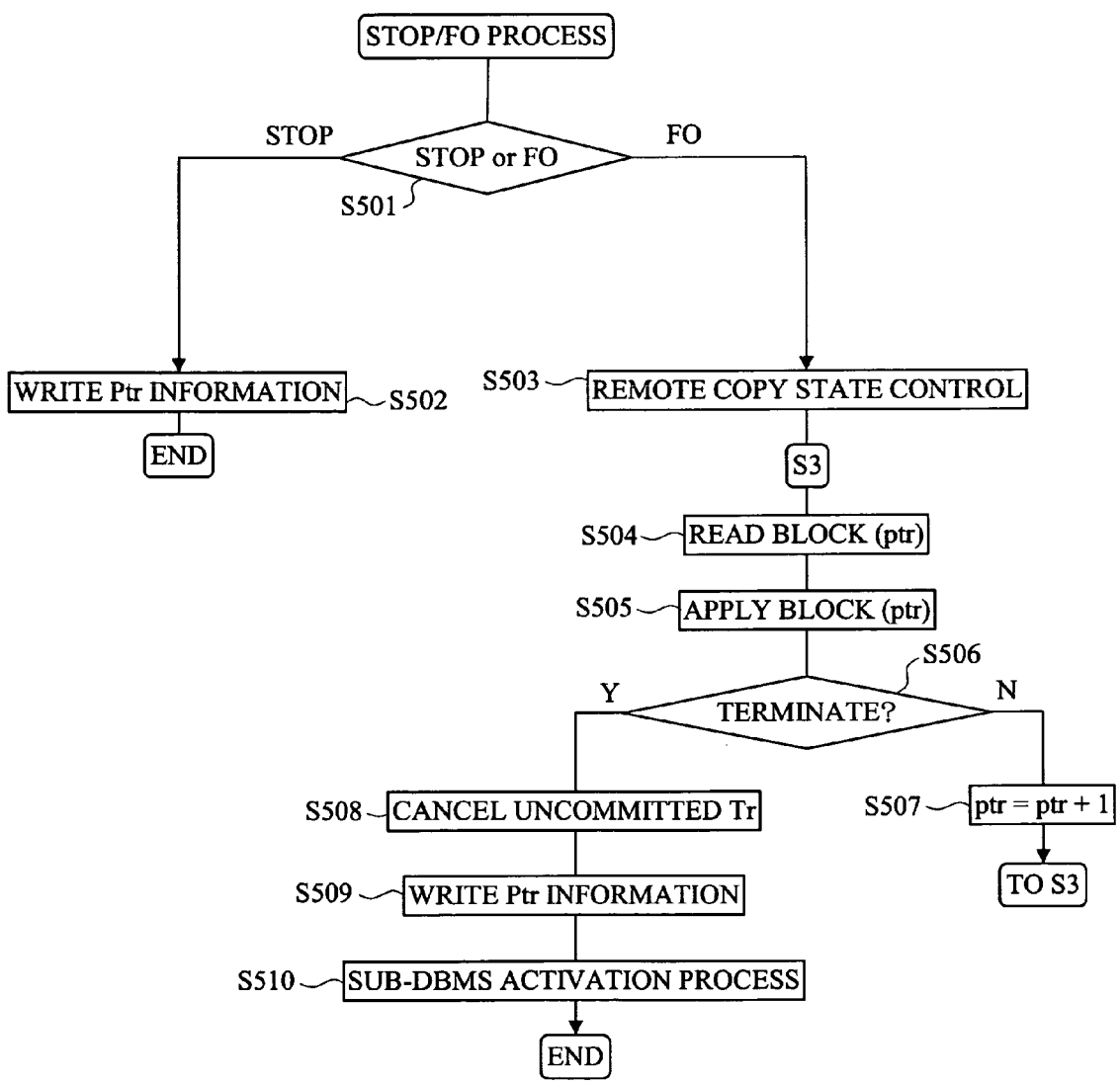
FIG. 5 is a diagram showing an example of the flow of the log reading/application process (at a switching time) according to the first embodiment of the present invention.
Figure 6:
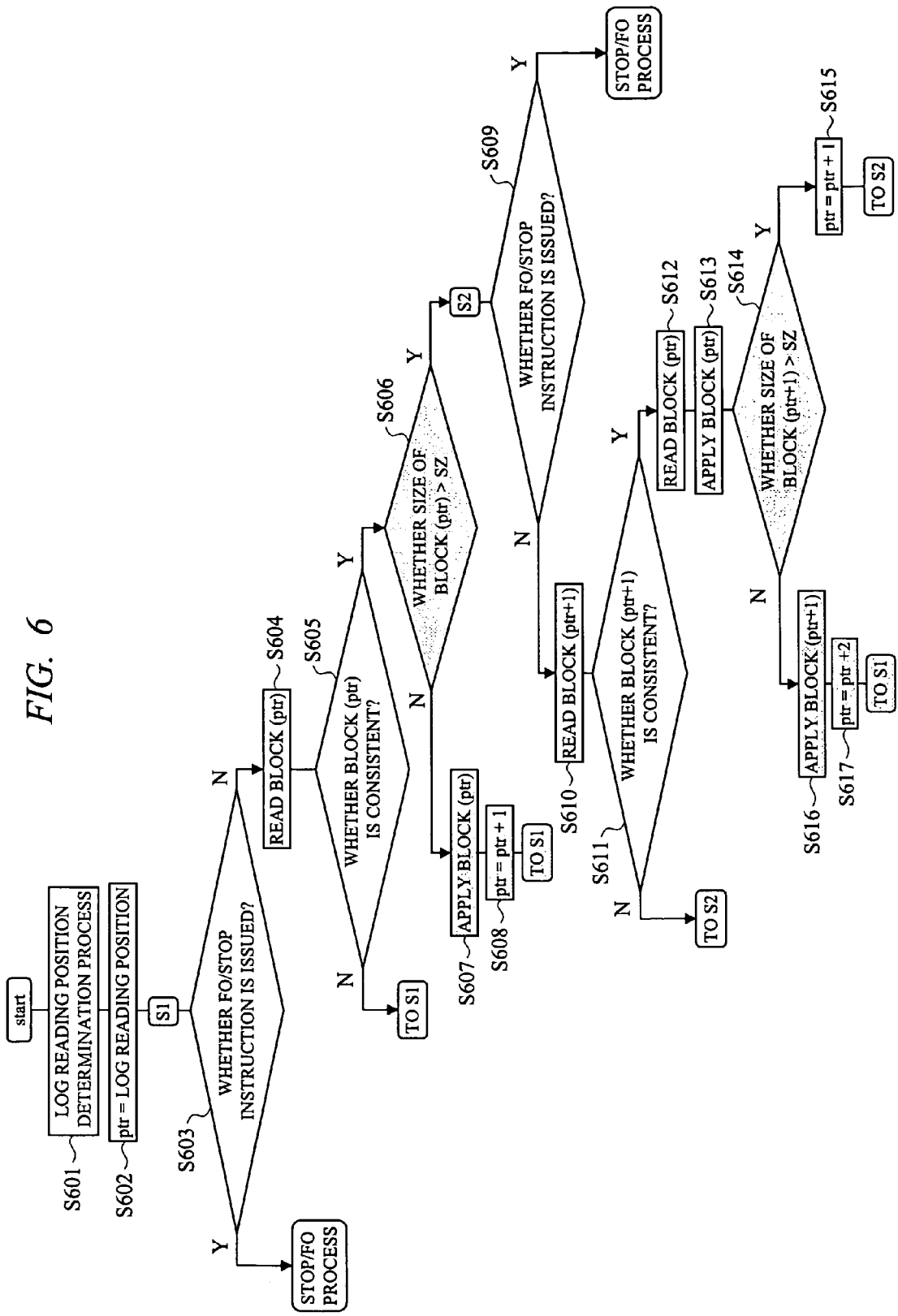
FIG. 6 is a diagram showing an example of the flow of the log reading/application process (at a switching time and determination of SZ) according to the first embodiment of the present invention.

Next, an example of the flow of the log reading and application process in the DR system according to this embodiment will be described with reference to FIG. 4 to FIG. 6. FIG. 4 is a diagram showing an example of the flow at a normal time, FIG. 5 is a diagram showing an example of the flow at a switching time and FIG. 6 is a diagram showing an example of the flow at a normal time (including determination of SZ (size)), respectively.

Incidentally, the blocks are read one by one in this embodiment. However, it is also possible to read a plurality of blocks at once. When a plurality of blocks are read, the blocks except for the last one are targeted for the application, and the blocks are applied after rereading them.

In the log reading and application process (at a normal time) of FIG. 4, firstly the log reading position is determined (S401). In this step, the DBMS outputs inside information such as the serial number of the logs (LSN) whose application is completed and the log file and the DB file in use to a DBMS state file at a timing such as a check point.

In the log reading position determination step, the LSN and the log file in use are read from the DBMS state file to determine the block to be firstly read (S402). In this step, the reading is started at the block indicated by a pointer (ptr).

After the reading position is determined, it is determined whether FO/stop instruction is issued from the manager or the application (S403). If the FO/stop instruction is issued (Y), the flow shifts to a stop/FO process. Alternatively if the FO/stop instruction is not issued (N), the log reading and application process is repeated until the FO/stop instruction is issued.

Firstly, the block pointed by the ptr (hereinafter referred to as a block (ptr)) is read (S404). Next, the consistency of the block (ptr) is verified by the header and the trailer. In this step, it is determined whether or not the block (ptr) is consistent (S405). If the block (ptr) is not consistent (N), the flow returns to S1. Alternatively if the block (ptr) is consistent (Y), i.e. the block (ptr) can be correctly read, the flow shifts to S2.

Next, it is determined again whether the FO/stop instruction is issued (S406). If the FO/stop instruction is issued (Y), the flow shifts to a stop/FO process. Alternatively if the FO/stop instruction is not issued (N), a next block (ptr+1) is read and its consistency is verified. Firstly, the next block (ptr+1) is read (S407) and then it is determined whether the block (ptr+1) is consistent (S408). If the block (ptr+1) is not consistent (N), the flow returns to S2. Alternatively if the block (ptr+1) is consistent (Y), i.e. its consistency is verified, the block (ptr) is reread and then applied (S409 and S410). Then, the ptr is advanced to next block (S411), and the flow returns to S2.

Subsequently, the block pointed by the ptr+1 is read and verified. If the read and the verification have been performed without problems, the block pointed by the ptr is reread and applied.

The process when a FO/stop instruction is issued from the manager will be descried with reference to FIG. 5.

In this log reading and application process (at a switching time), firstly it is determined whether the instruction is a stop instruction or a FO instruction (S501). If it is the stop instruction (stop), ptr information is written to the DB state file as progress information of the log application and the process is completed (S502). Meanwhile, if it is the FO instruction (FO), firstly the state of the remote copy operation is controlled (S503). For example, if the FO is a disaster FO, the remote copy operation is disconnected and the subsequent writing from the main site is inhibited. Alternatively, if the FO is an intentional FO, the direction of the remote copy is set to be reversed.

Next, the block (ptr) is read and its consistency is verified. Subsequently, the log reading and application process is repeated until it is determined that the log is the last one. That is, the block (ptf) is read and then applied (S504 and S505), and thereafter it is determined whether the block is the last one (S506). In this step, since the state of the remote copy operation has been controlled, the writing through the remote copy operation does not conflict with the reading. Therefore, it is not necessary to reread the logs.

If the block is not the last one (N), the ptr is advanced to next block (S507) and the flow returns to S3. Alternatively if it is determined that the block is the last one (Y), i.e. there is not any block to be read, uncommitted transactions are canceled (undo process) (S508). In this step, if only the committed transactions are applied in the log application process, the cancel process is unnecessary. Next, it is written to the state file that the DB file is consistent (S509) and a sub-DBMS is activated (S510), and then the process is completed.

The process including the size (SZ) determination at a normal time will be described with reference to FIG. 6. If the block is smaller than the cache management size and collectively written, the log block whose middle portion is empty is not read. Therefore, only if the block size is larger than the cache management size, the block is reread in this process. Incidentally, the log reading and application process (at a normal time and including the SZ determination) is an example in which the SZ determination process is added to the above-described process of FIG. 4. Thus the additional part will be mainly described.

Similar to FIG. 4, firstly the log reading position is determined (S601). Next, the log reading position of the block (ptr) is determined (S602), and then, it is determined whether a FO/stop instruction is issued (S603). Next, the block (ptr) is read (S604) and it is determined whether the block (ptr) is consistent (S605). Then, if the block (ptr) is consistent (Y), it is determined whether the size of the block (ptr) is larger than the cache management size SZ (S606). If the size of the block (ptr) is larger than the SZ (Y), the flow shifts to S2. Alternatively, if the size of the block (ptr) is not larger than the SZ (N), the block (ptr) is applied (S607) and the ptr is advanced to next block (S608), then the flow returns to S1.

After the shift to S2, similar to FIG. 4, it is determined whether a FO/stop instruction is issued (S609). Next, the block (ptr+1) is read (S610) and it is determined whether the block (ptr+1) is consistent (S611). Then, the block (ptr) is reread and applied (S612 and S613). Subsequently, it is determined whether the size of the next block (ptr+1) is larger than the cache management size SZ (S614). If the size of the block (ptr+1) is larger than the SZ (Y), the ptr is advanced to next block (S615) and the flow returns to S2. Alternatively, if the size of the block (ptr+1) is not larger than the SZ (N), the block (ptr+1) is applied (S616) and the ptr is advanced two blocks (S617), then the flow returns to S1.

According to the DR system of the present invention as described above, the following effects can be obtained.

(1) If the method of using the log rereading is adopted and the logs are synchronously transferred, it is possible to assure that the logs has no defects. Additionally, since the logs can be transferred without consuming the server resource when the remote copy operation is adopted, the influence on the online performance of the main site can be reduced.

(2) Since the method of using the log rereading is adopted, it is not necessary to transfer the DB file which is frequently updated. Therefore, the narrow bandwidth line may be used, and thus, the cost of the line can be reduced.

(3) Since the logs are applied in units of a block finer than a file, the service can be restarted even at the time of switching.

(4) The log application process can independently performed only by the log application unit of the sub-site to recover the DB without additionally providing the process and the communication for determining the log reading position for the main site.

<Second Embodiment>

The DR system according to the second embodiment of the present invention will be described with reference to FIG. 7 to FIG. 13.

Figure 7:
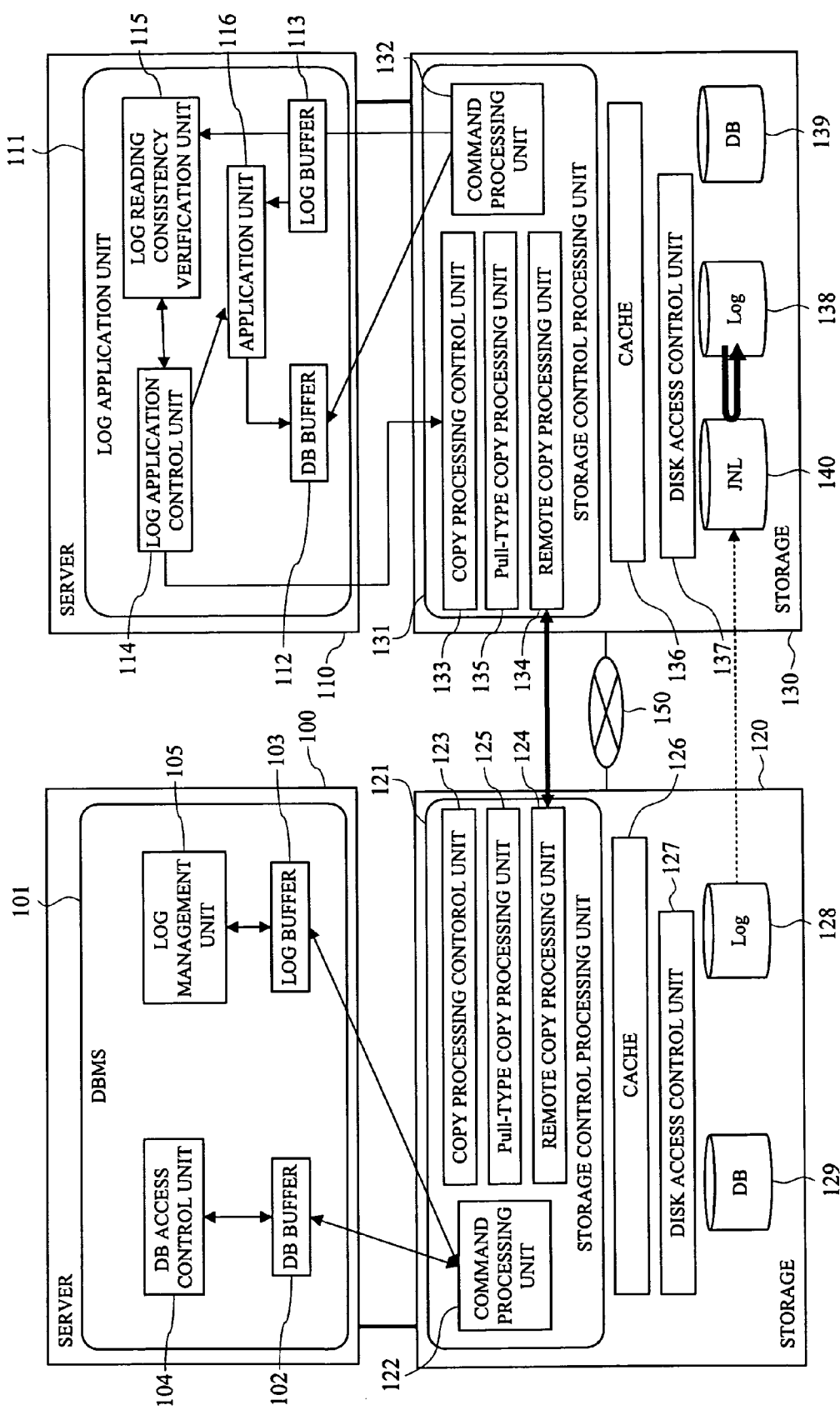
FIG. 7 is a diagram showing an example of the configuration of the DR system according to the second embodiment of the present invention.

Firstly, an example of the configuration of the DR system according to this embodiment will be described with reference to FIG. 7. FIG. 7 is a diagram showing an example of the configuration of the DR system.

The DR system according to this embodiment adopts a method of using the log reading in cooperation with a remote copy operation. For example, when the reading process and the writing process conflict, the log is read incorrectly. Therefore, in the method of using the log reading in cooperation with the remote copy operation as described in this embodiment, the writing process through the remote copy operation is forbidden when the reading process is performed by the log application function. By doing so, the conflict between the reading process and the writing process can be prevented.

Comparing with the first embodiment, a Pull-type copy processing unit 125 is added to the storage 120 of the main site, and a Pull-type copy processing unit 135 and a JNL VOL (JNL) 140 are added to the storage 130 of the sub-site in the DR system according to this embodiment.

Figure 8:
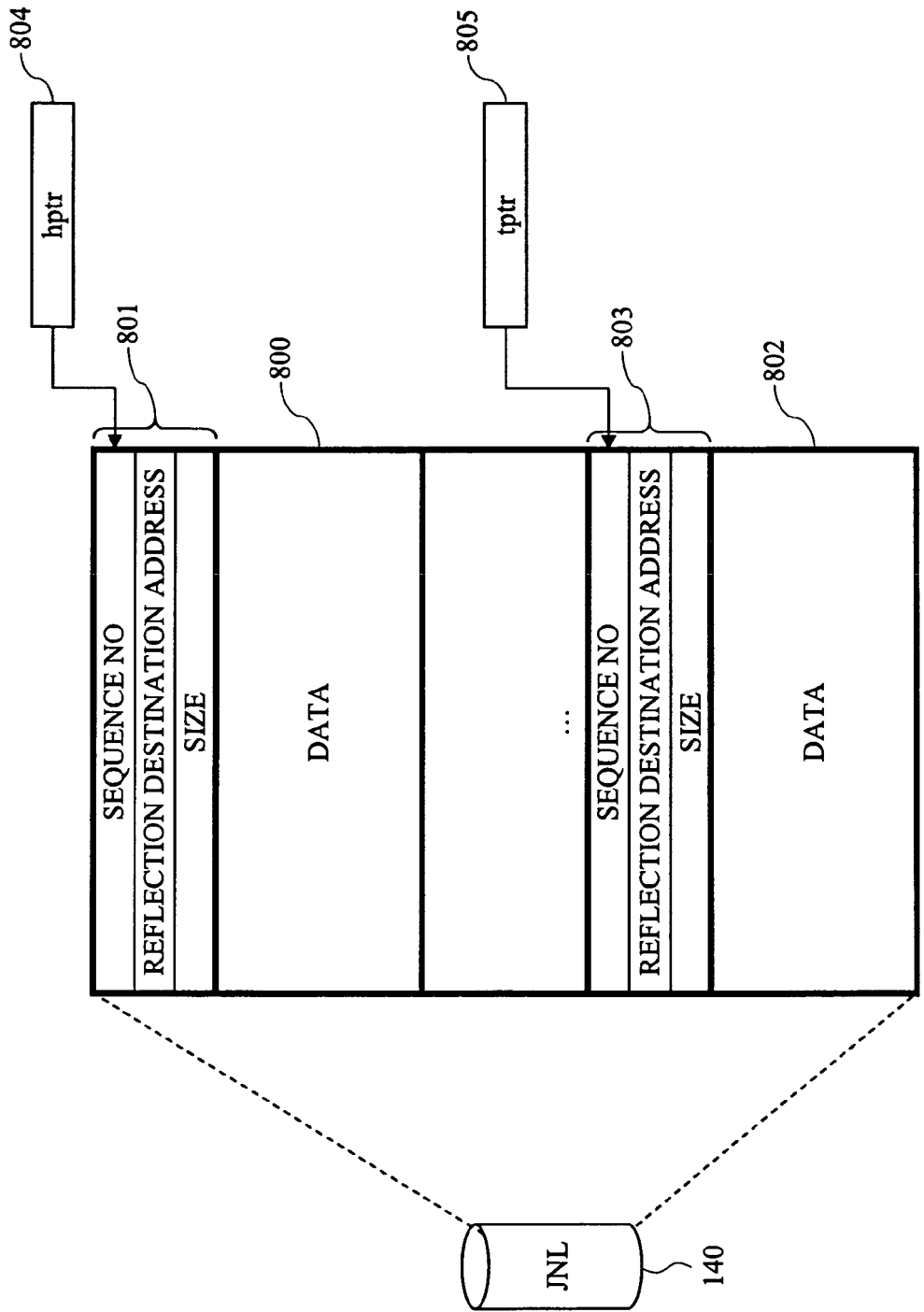
FIG. 8 is a diagram showing the JNL VOL and an example of the configuration of data to be stored according to the second embodiment of the present invention.

The JNL VOL 140 as shown in FIG. 8 is disposed in the storage 130 of the sub-site. FIG. 8 is a diagram showing an example of the JNL VOL and the configuration of data to be stored. The JNL VOL 140 stores data 800, metadata 801 consisting of the sequence NO, the reflection destination address and the size, . . . , data 802 and metadata 803. A pointer 1 (hptr) 804 points the sequence NO of the metadata 801, and a pointer 2 (tptr) 805 points the sequence NO of the metadata 803.

The JNL VOL 140 is disposed in the storage 130 of the sub-site so that information in the log VOL 128 of the main site is transmitted to the log VOL 138 of the storage 130 of the sub-site through two-stage copy operation. That is, the information is copied from the log VOL 128 of the main site to the JNL VOL 140 of the sub-site through the first copy operation. At this time, data to which information such as the serial number and the time stamp is added is additionally written to the JNL VOL 140. The copy operation (Pull-type copy) from the JNL VOL 140 to the log VOL 138 is asynchronously performed.

Additionally, in this embodiment, an interface to control (stop/restart) the copy from the JNL VOL 140 by the control program of the storage 130 of the sub-site is provided. When the log is read, the log application function firstly stops the Pull-type copy operation. Consequently, it is possible to inhibit the writing process to the log VOL 138. Therefore, the log reading and application can be performed in accordance with the normal procedure (without rereading). If it is failed to read the block, the Pull-type copy operation is restarted and new information is reflected in the log VOL 138. After a fixed time lapses or if the amount of the Pull-type copy exceeds a certain threshold value, the Pull-type copy operation is stopped again and the log reading and application is restarted.

Figure 9:
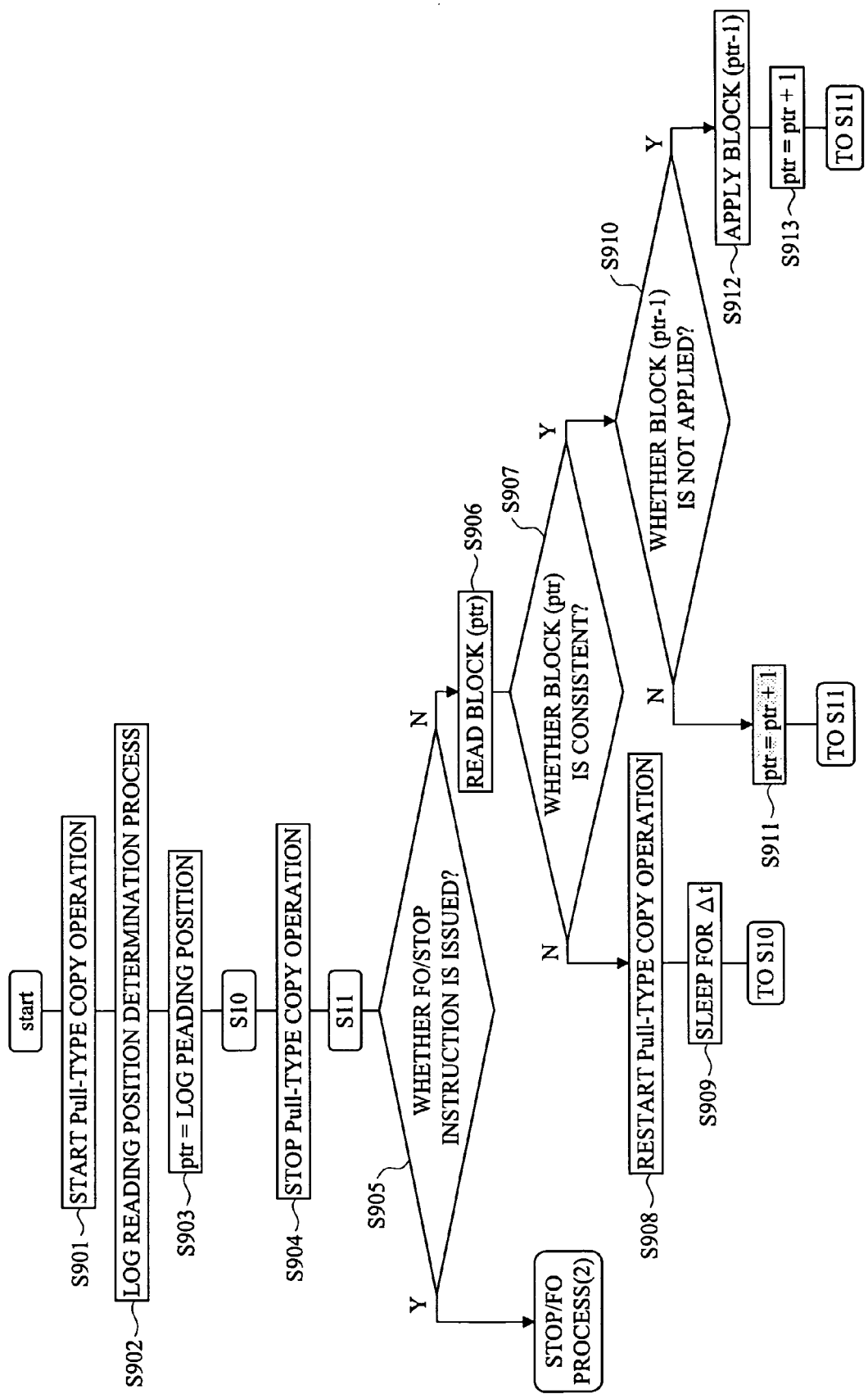
FIG. 9 is a diagram showing an example of the flow of the log reading/application process (at a normal time and a fixed time lapses) according to the second embodiment of the present invention.
Figure 10:
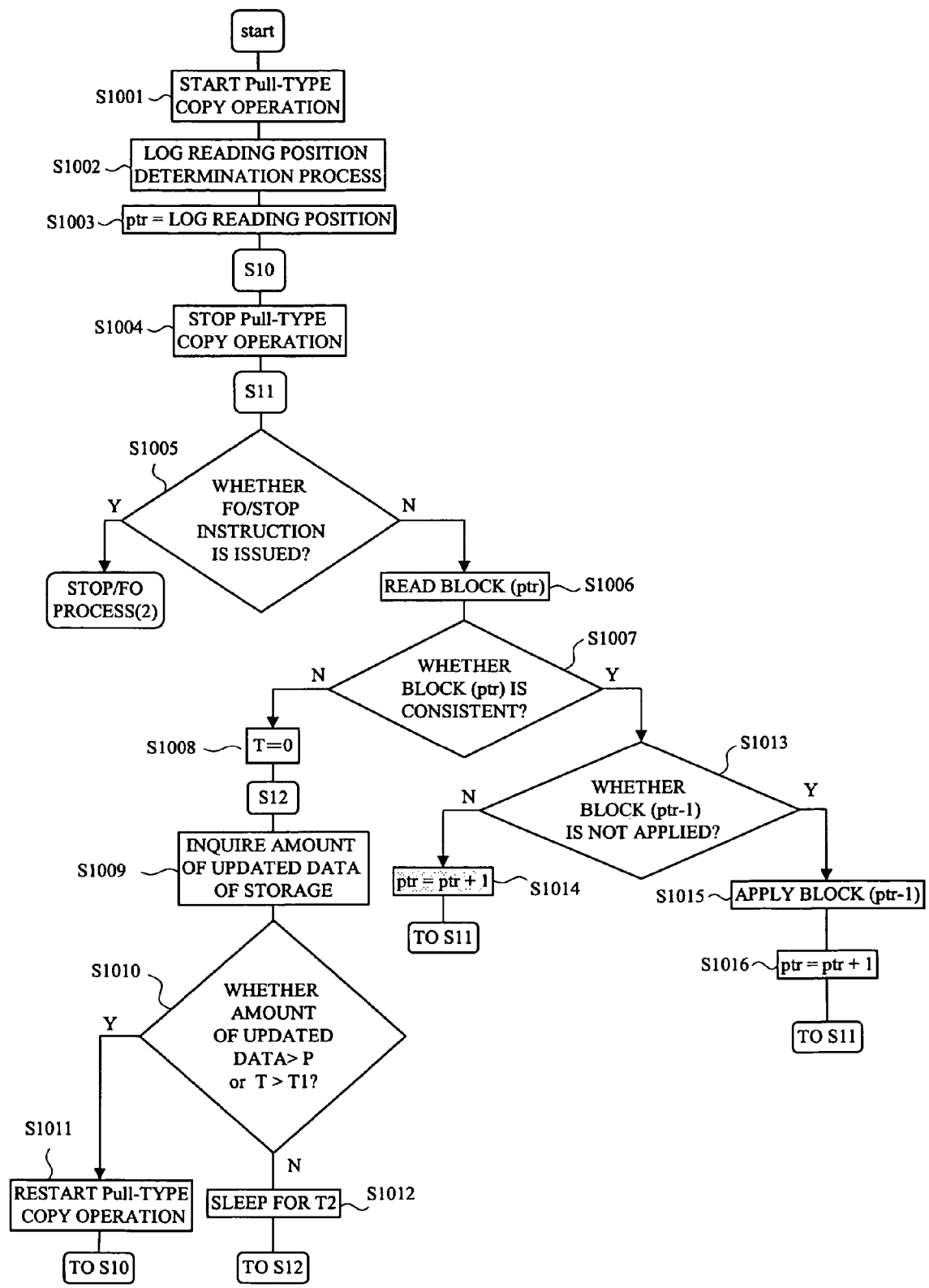
FIG. 10 is a diagram showing an example of the flow of the log reading/application process (at a normal time and overflow of the updated data) according to the second embodiment of the present invention.
Figure 11:
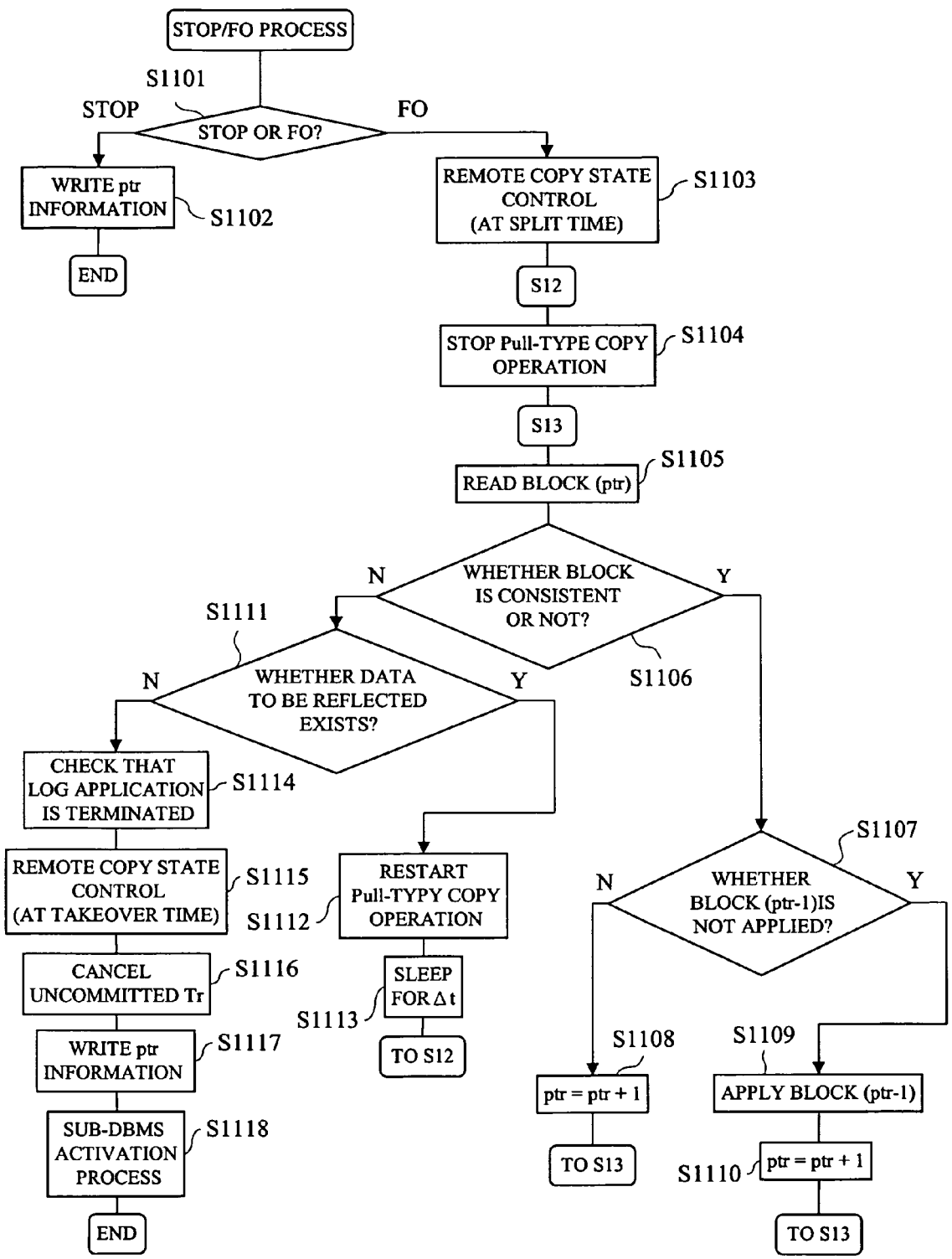
FIG. 11 is a diagram showing an example of the flow of the log reading/application process (at a switching time) according to the second embodiment of the present invention.

Next, an example of the flow of the log reading and application process in the DR system according to this embodiment will be described with reference to FIG. 9 to FIG. 11. FIG. 9 is a diagram showing an example of the flow at a normal time (a fixed time lapses), FIG. 10 is a diagram showing an example of the flow at a normal time (overflow of the updated data) and FIG. 11 is a diagram showing an example of the flow at the time of switching, respectively.

Here, the different part from the log reading and application process shown in FIG. 4 of the above-described first embodiment will be mainly described with reference to FIG. 9.

In this log reading and application process (at a normal time and a fixed time lapses), firstly the Pull-type copy operation is started (S901). Then, similar to the above-described case of performing the rereading, the log reading position is determined (S902), and the log reading position of the block (ptr) is determined (S903). Then, the Pull-type copy operation is interrupted (S904) and the flow shifts to S11. After the Pull-type copy operation is interrupted, the logs are repeatedly applied as long as the logs can be read (as long as the logs can be verified by the header/trailer).

After the shift to S11, it is determined whether a FO/stop instruction is issued (S905). Next, the block (ptr) is read (S906) and it is determined whether the block (ptr) is consistent (S907). If the block (ptr) is not consistent (N), i.e. it is failed to read the log and the reflected part has been read and applied, the Pull-type copy operation is changed to the restart state (S908). Subsequently, after a fixed time lapses or if the amount of reflected data of the Pull-type copy operation exceeds a predetermined value, the Pull-type remote copy operation is interrupted again and the log reading and application is performed.

More specifically, after the Pull-type copy operation is restarted, the flow returns to S10 after the sleep for a time At (S909). If the block (ptr) is consistent (Y), it is determined whether a block (ptr−1) has not been applied (S910). As a result of the determination, if the block (ptr−1) has been applied (N), the ptr is advanced to next block (S911) and the flow returns to S11. Alternatively if the block (ptr−1) has not been applied (Y), the application of the block (ptr−1) is performed (S912) and the ptr is advanced to next block (S913), and then the flow returns to S11.

In the log reading and application process (at a normal time and overflow of the updated data) of FIG. 10, firstly the same processes as FIG. 9 (S1001-S1007, and S1013-S1016) are performed. As a result of the determination in S1007, if the block (ptr) is not consistent (N), the time T is set to 0 (S1008) and the flow shifts to S12. After the shift to S12, the amount of updated data of the storage is inquired (S1009). Then, it is determined whether the amount of updated data is larger than a predetermined constant P, or whether the time T lapses for a fixed time T1 (S1010).

As a result of the determination, if the amount of updated data exceeds a constant or if the fixed time lapses (Y), the Pull-type copy operation is restarted (S1011) and the flow returns to S10. Otherwise (N), it returns to S12 after a sleep for a time T2 (S1012). Incidentally, in order to prevent the increase of the number of inquiries to the storage, the second and subsequent inquiries are performed after the time T2 (<T1) lapses.

The process when the FO/stop instruction is issued from the manager will be described with reference to FIG. 11.

In this log reading and application process (at a time of switching), firstly it is determined whether the instruction is a stop instruction or a FO instruction (S1101). If it is the stop instruction (stop), ptr information as progress information for the log application is written to the DB state file (S1102) and the process is completed. Alternatively, if it is the FO instruction (FO), the remote copy operation is disconnected when the FO is a disaster FO and the remote copy operation is interrupted when the FO is an intentional FO. That is, firstly the state of the remote copy operation is controlled (at a split time) (S1103).

Next, the log application process is performed. Firstly, the Pull-type copy operation is stopped (S1104). Next, the block (ptr) is read (S1105) and it is determined whether the block (ptr) is consistent (S1106). The application process is repeated as long as the block (ptr) is consistent. That is, it is determined whether a block (ptr−1) has not been applied (S1107). If it has been applied (N), the ptr is advanced to next block (S1108) and the flow returns to S13. Alternatively if it has not been applied (Y), the block (ptr−1) is applied (S1109) and the ptr is advanced to next block (S1110), and then the flow returns to S13.

Meanwhile, the block (ptr) is not consistent (N), firstly it is determined whether data to be reflected is included in the JNL VOL (S1111). If the data to be reflected remains in the JUL VOL (Y), the Pull-type copy operation is restarted (S1112). Then, the flow returns to S12 after sleep for Δt (S1113), and then the log application process is repeated. If any dada to be reflected does not exist (N), it is checked that the terminal log has been applied (S1114). In this case, if the FO is an intentional FO, the direction of the remote copy is set to be reversed.

After the state of the remote copy operation is controlled (at a takeover time) (S1115), uncommitted transactions are canceled (S1116). Incidentally, if only the committed transactions are applied in the log application process, the cancel process is not required. After all of the transactions are committed, information is written to the DBMS state file (S1117), and the sub-DBMS is activated (S1118) and the process is completed.

Incidentally, the blocks are read one by one in this case. However, it is also possible to read a plurality of blocks at once. When a plurality of blocks are read, the blocks except for the last one are targeted for the application, and the blocks are applied.

Figure 12:
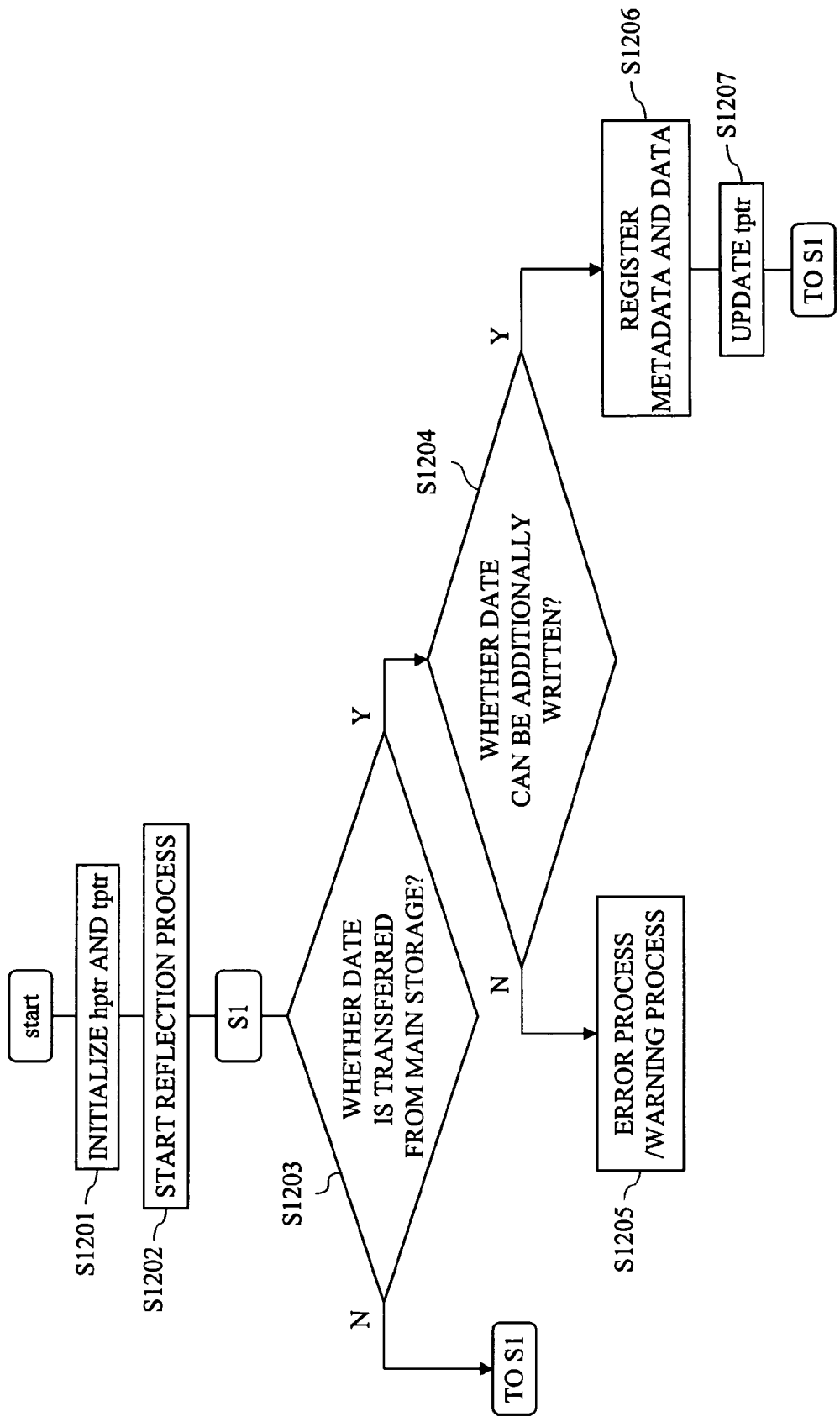
FIG. 12 is a diagram showing an example of the flow of the copy process (remote copy) of the sub-storage according to the second embodiment of the present invention.

Next, an example of the flow of the copy process in the sub-storage in the DR system according to this embodiment will be described with reference to FIG. 12 and FIG. 13. FIG. 12 is a diagram showing an example of the flow of the remote copy operation, and FIG. 13 is a diagram showing an example of the flow of the reflection process from the JNL VOL, respectively.

In the copy process (remote copy) in the sub-storage of FIG. 12, firstly a pointer 1 (hptr) and a pointer 2 (tptr) are initialized (S1201). Then a reflection process is started (S1202) and the flow shifts to S1. Next, it is determined whether data is transferred from the main storage (S1203). If any data is not transferred from the main storage (N), the flow returns to S1. If data is transferred from the main storage (Y), it is determined whether data can be additionally written (S1204). As a result of the determination, if it is impossible to perform the additional writing (N), an error process/warning process is performed (S1205). Alternatively, if it is possible, metadata and data are registered (S1206) and the tptr is updated (S1207), and the flow returns to S1.

Figure 13:
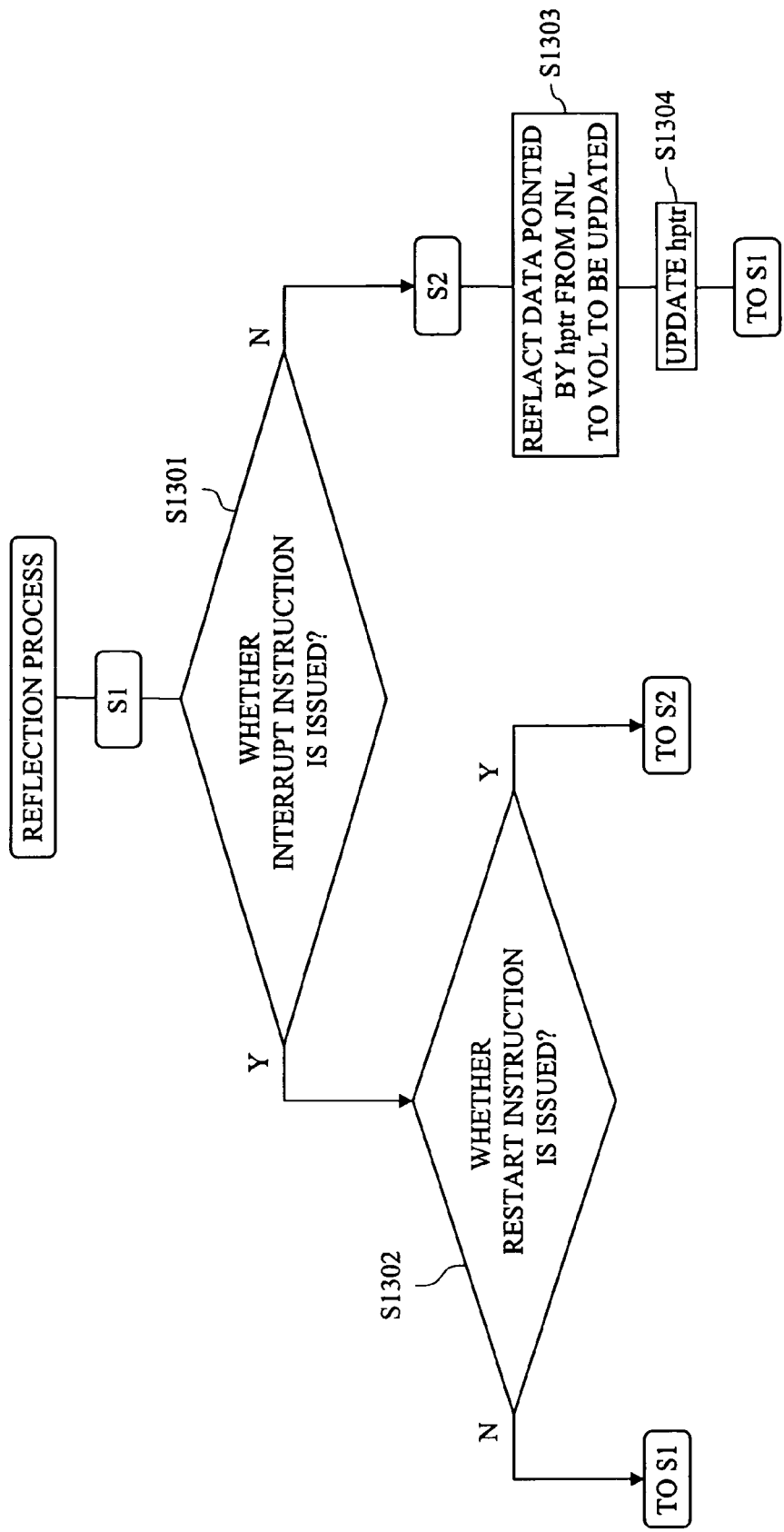
FIG. 13 is a diagram showing an example of the flow of the copy process (reflection process from JNL VOL) of the sub-storage according to the second embodiment of the present invention.

In the copy process in the sub-storage (reflection process from the JNL VOL) of FIG. 13, firstly it is determined whether an interrupt instruction is issued after S1 (S1301). If the interrupt instruction is not issued (N), the flow shifts to S2. Alternatively if the interrupt instruction is issued (Y), it is determined whether a restart instruction is subsequently issued (S1302). As the result of the determination, if the restart instruction is not issued (N), the flow returns to S1. Alternatively if the restart instruction is issued (Y), it shifts to S2. After the shift to S2, the data indicated by the pointer 1 (hptr) is reflected from the JNL VOL to a VOL to be updated (S1303). Then, the hptr is updated (S1304) and the flow returns to S1.

According to the DR system of this embodiment as described above, the same effects as the above-described (1) to (4) of the first embodiment can be obtained. In addition, since the method of using the reading in cooperation with the remote copy operation is adopted, owing to the rereading process and the reading process in cooperation with the remote copy operation, it is possible to prevent the DB from being destroyed due to the incorrect reading even if the IO unit of the logs is large. Accordingly, the DR system according to this embodiment can be applied to the sub-site located away from the main site more than several hundred km in consideration of a wide area disaster.

<Third Embodiment>

Figure 14:
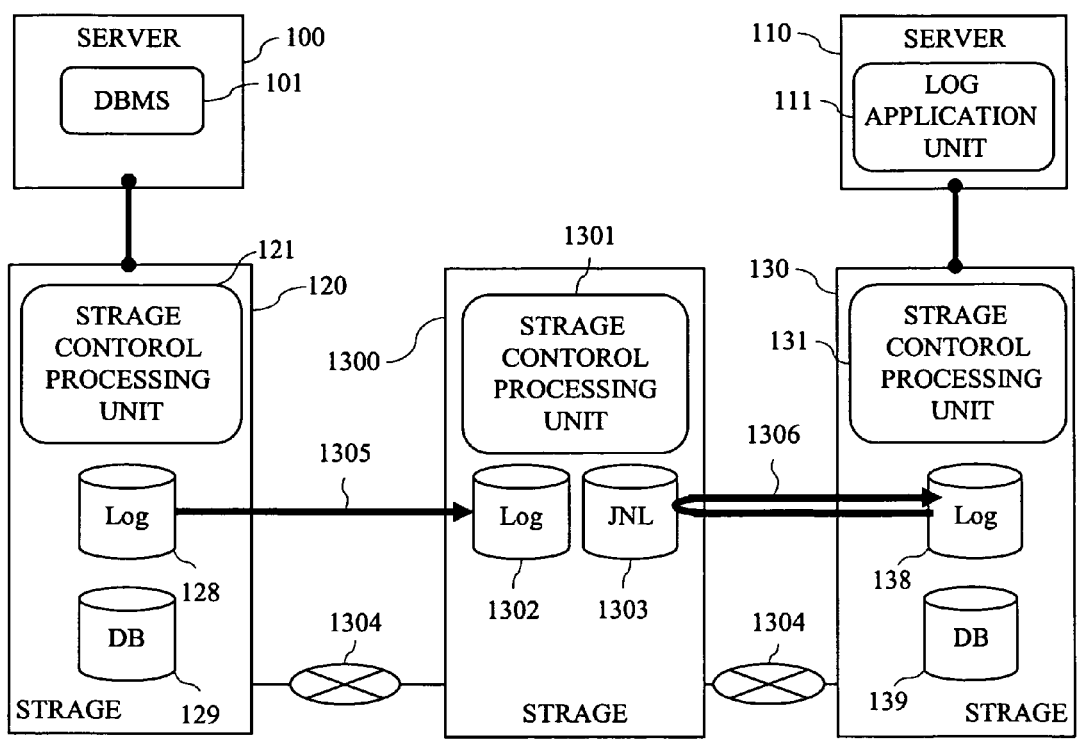
FIG. 14 is a diagram showing an example of the configuration of the DR system according to the third embodiment of the present invention.
Figure 17:
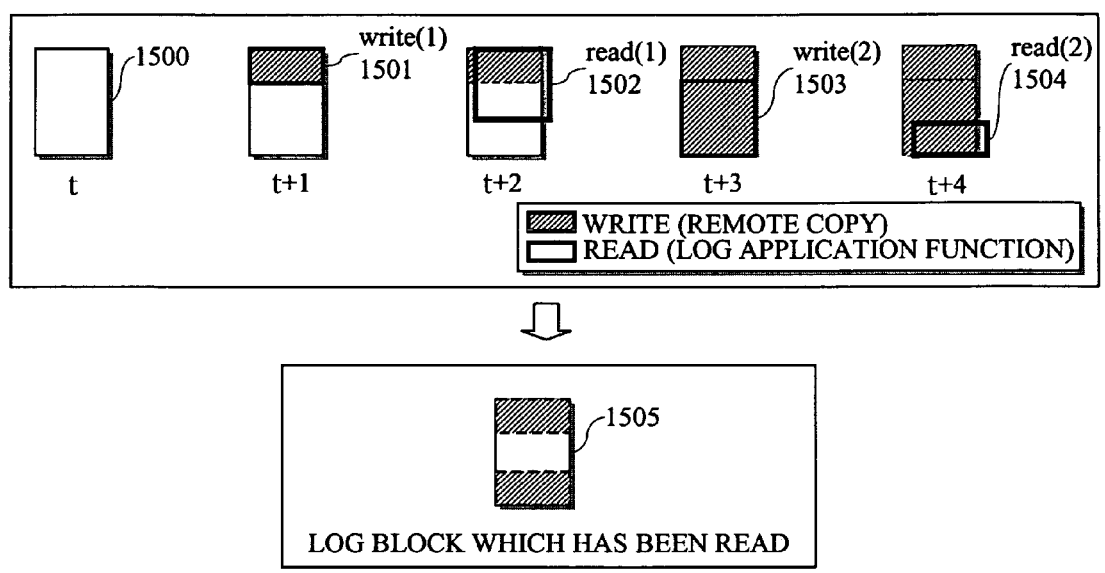
FIG. 17 is a diagram showing an example when the log cannot be normally read in the system to which the conventional method 1 is applied in comparison with the present invention.

The DR system according to the third embodiment of the present invention will be described with reference to FIG. 14.

An example of the configuration of the DR system according to this embodiment will be described with reference to FIG. 14. FIG. 14 is a diagram showing an example of the configuration of the DR system.

The DR system according to this embodiment comprises a main site, a sub-site and a relay site to relay between the main site and the sub-site. A server 100 and a storage 120 of the main site and a server 110 and a storage 130 of the sub-site are the same as those shown in FIG. 1 of the first embodiment or FIG. 7 of the second embodiment. The relay site is formed of a storage 1300, and the storage 1300 includes a storage control processing unit 1301, a log VOL 1302, and a JNL VOL 1303.

The storage 120 of the main site and the storage 1300 of the relay site are connected through a network 1304, and the storage 1300 of the relay site and the storage 130 of the sub-site are also connected through the network 1304. A remote copy 1305 as the first copy operation is performed from a log VOL 128 in the storage 120 of the main site to a log VOL 1302 in the storage 1300 of the relay site. A remote copy 1306 as the second copy operation is performed from a log VOL 138 in the storage 130 of the sub-site to JNL VOL 1303 in the storage 1300 of the relay site.

The DR system according to this embodiment can provide the same effects as those of the first and second embodiments.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a disaster recovery technology by means of a log transfer. More specifically, the present invention relates to the technology effectively applied to a DR technology in which logs are read and applied in units finer than a file and the log rereading or the reading in cooperation with a remote copy operation is used in the log reading and application process.

What is claimed is:

1. A log application method for maintaining a backup database in a sub-storage of a sub-site, the backup database being a replica of a main database maintained in a main storage of a main site by a database system, said log application method comprising the steps of:

storing, by a first server, log records in said main storage, the log records indicating history of updating of said main database, wherein the log records are stored in units of log blocks, each log block including a header and a trailer, and a plurality of said log records between said header and said trailer, wherein a second server reads from said header to said trailer when said second server reads said log block, wherein said main site comprises said first server, said main storage, and a first controller, and said sub-site comprises said second server, said sub-storage, and a second controller, wherein said sub-site is located at a remote site, and wherein said first controller and said main storage are coupled to said first server, and said second controller and said sub-storage are coupled to said second server;

copying said log blocks of said main database from said main storage of said main site to said sub-storage of said sub-site through a remote copy operation performed by said first controller of said main storage of said main site and said second controller of said sub-storage of said sub-site, by transferring said log blocks stored in said main storage from said main storage of said main site to said sub-storage of said sub-site, wherein said remote copy operation is performed independently of said first server and said second server;

reading, by said second server, a first log block including log records to be applied to said backup database, which is stored next to a log block including log records last applied, from said sub-storage to verify consistency of said first log block, said header and said trailer included in said first log block being used to verify the consistency;

determining, after said second server has read said header and said trailer included in said first log block, whether a rereading process on said first log block is expected to be free from conflicting with the writing process of said remote copy operation by first determining whether a second log block can be read, and when the second log block can be read, reading said second log block, which is next to said first log block; and when said rereading process on said first log block has been determined to be free from conflicting with the writing process of said remote copy operation, rereading, by the second server, the first log block including the log records to be applied, and then applying the log records contained in the reread first log block to said backup database.

2. A log application method for maintaining a backup database in a sub-storage of a sub-site, the backup database being a replica of a main database maintained in a main storage of a main site by a database system, said log application method comprising the steps of:

storing, by a first server, a plurality of log records in said main storage, the log records indicating history of updating of said main database, said log records being stored in said main storage, wherein the log records are stored in units of log blocks, each log block including a header and a trailer, and a plurality of said log records between said header and said trailer, wherein a second server reads from said header to said trailer when said second server reads said log block, wherein said main site comprises said first server, said main storage, and a first control unit, and said sub-site comprises said second server, said sub-storage, and a second control unit, wherein said sub-site is located at a remote site, and wherein said first control unit and said main storage are coupled to said first server, and said second control unit and said sub-storage are coupled to said second server;

copying said log blocks of said main database from said main storage of said main site to said sub-storage of said sub-site through a remote copy operation, said remote copy operation being performed by said first control unit of said main storage and said second control unit of said sub-storage of said sub-site, by transferring said log blocks stored into said main storage from said main storage to said sub-storage of said sub-site, wherein said remote copy operation is performed independently of said first server and said second server;

reading, by said second server, a first log block, which contains log records to be applied to said backup database, said log block being read from said sub-storage;

after said second server has read said header and said trailer included in said first log block, verifying, by said second server, consistency of said first log block read from said sub-storage, said header and said trailer included in said first log block being used to verify the consistency of said first log block; and when as a result of verifying said consistency of said first log block, said first log block read from said sub-storage is determined to be consistent, and when said first log block read from said sub-storage is not the latest log block from among said log blocks copied to said sub-storage, applying, by said second server, the log records contained in said first log block read from said sub-storage to said backup database, wherein said step of applying comprises;

reading, by said second server, a succeeding log block succeeding said first log block read from said sub-storage;

verifying, by said second server, consistency of said succeeding log Block; and applying said log records contained in said first log block read from said sub-storage to said backup database if said succeeding log block is consistent as a result of said step of verifying.

3. The log application method according to claim 2, further comprising the steps of:

changing a status of the remote copy operation so as not to cause further copy operation from said main storage to said sub-storage when a switching instruction is issued from a manager or an application;

reading, by said second server, a log block, which contains log records to be applied to said backup database, from said sub-storage;

applying, by said second server, log records contained in said log block read from said sub-storage to said backup database, if said log block read from said substorage is consistent as a result of said step of verifying;

determining, by said second server, whether said log block read by said reading step (succeeding to said changing step) is the last log block, and repeating from said reading step to said applying step (succeeding to said changing step) if said log block is not the last log block; and canceling, by said second server, an update operation regarding an uncommitted transaction if there are any uncommitted transactions.

4. The log application method according to claim 2, wherein said copying step includes a first copy operation for copying log blocks of said main database from said main storage to a first volume of said sub-storage through said remote copy operation, and a second copy operation for copying log blocks from said first volume to a second volume of said sub-storage, and wherein said second copy operation is executed asynchronous to said first copy operation.

5. The log application method according to claim 4, further comprising the step of:

suspending said second copy operation prior to said reading step, and wherein said step of reading reads a log block from said second volume as said log block read from said sub-storage, and wherein said step of applying applies log records contained in said log block read from said second volume even if said log block read from said sub-storage is the latest log block among log blocks copied to said second volume.

6. The log application method according to claim 5, further comprising the step of:

resuming said second copy operation after interrupting said log application process when there are no log blocks to be read in said second volume.

7. The log application method according to claim 5, further comprising the steps of:

acquiring an amount of log blocks copied to said first volume by said remote copy operation after said second copy operation is suspended by said step of suspending; and resuming said second copy operation if said amount of log blocks acquired by said step of acquiring exceeds a predetermined value.

8. The log application method according to claim 5, further comprising the steps of:

changing a status of said first copy operation so as not to cause further writing in response to a switching instruction issued by a manager or an application;

determining whether there are any log blocks to be copied to said second volume;

resuming said second copy operation such that all of the log blocks to be copied to said second volume are copied to said second volume from said first volume if any log blocks to be copied remain in said first volume;

repeating said steps of reading, verifying, and applying until all log blocks having log records to be applied to said backup database are processed; and canceling, by the second computer, an update operation regarding an uncommitted transaction if there are any uncommitted transactions.

9. A disaster recovery system comprising:

a first storage, located in a main site, said first storage having a first control unit and a first storage unit storing a main database and a first log file;

a first computer, located in said main site, on which a database management system maintaining said main database is operated;

a second storage, located in a sub-site, said second storage having a second control unit and a second storage unit storing a backup database and a second log file; and a second computer, located in said sub-site, on which a program to execute a log application process is operated, wherein said first computer stores a plurality of log records in said first storage, the log records indicating history of updating of said main database into said first log file, wherein the log records are stored in units of log blocks, each log block including a header and a trailer, and a plurality of said log records between said header and said trailer, wherein said second computer reads from said header to said trailer when said second computer reads said log block, wherein said sub-site is located at a remote site, wherein said first control unit and said first storage are coupled to said first computer, and said second control unit and said second storage are coupled to said second computer, wherein said first control unit of said first storage of said main site and said second control unit of said second storage of said sub-site perform a remote copy function, by successively transferring the log blocks stored in the first log file in said first storage from said first storage to said second log file in said second storage, wherein said remote copy function is performed independently of said first computer and said second computer, and wherein said log application process includes the steps of:

reading a first log block, which contains log records to be applied to said backup database, from said second log file in said second storage;

after said second computer has read said header and said trailer included in said first log block, verifying consistency of said first log block read from said second log file, said header and said trailer included in said first log block being used to verify the consistency of said first log block; and when as a result of verifying said consistency of said first log block, said first log block read from said second log file is determined to be consistent, and when said first log block read from said second log file is not the latest log block from among said log blocks copied to said second log file, applying the log records contained in said first log block read from said second log file to said backup database, and wherein said step of applying of said log application process includes the steps of:

reading a succeeding log block that succeeds said log block read from said second log file;

verifying consistency of said succeeding log block; and applying said log records contained in said log block read from said second log file to said backup database if said succeeding log block is consistent as a result of said verifying.

\* \* \* \* \*